June 3, 1924.
B. P. POORE
1,496,376
MACHINE FOR SIZING AND DISTRIBUTING FRUIT AND OTHER ARTICLES
Filed Oct. 13, 1921      6 Sheets-Sheet 1
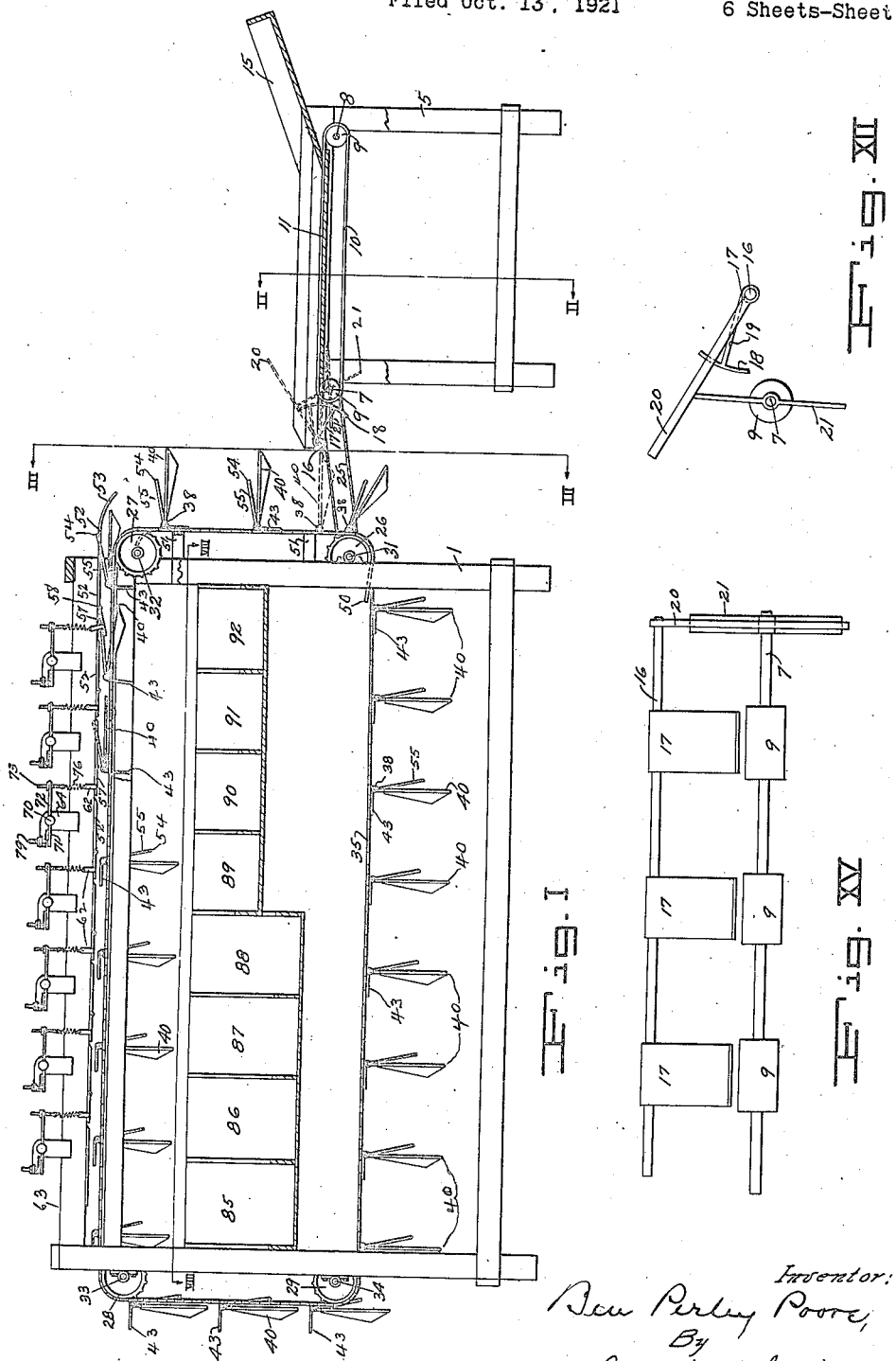

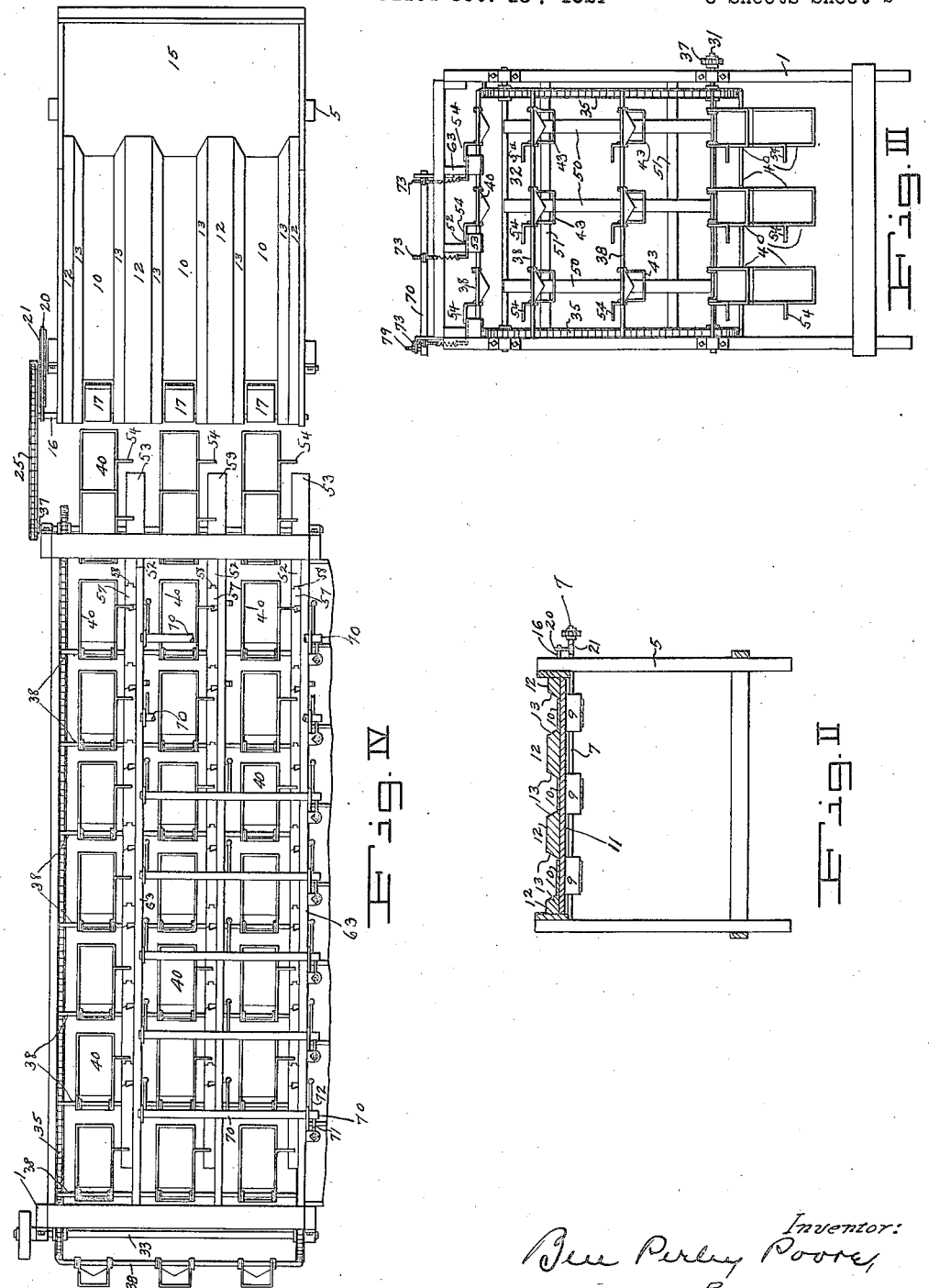

June 3, 1924.
B. P. POORE
1,496,376
MACHINE FOR SIZING AND DISTRIBUTING FRUIT AND OTHER ARTICLES
Filed Oct. 13, 1921
6 Sheets-Sheet 3
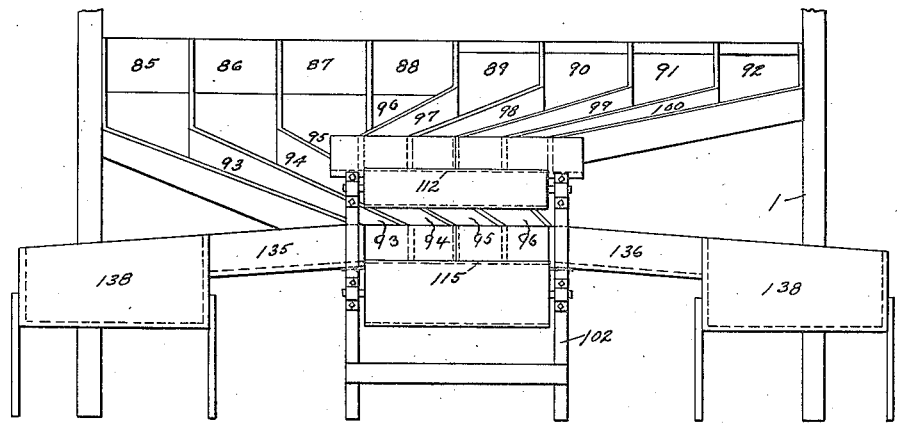
Fig. VII
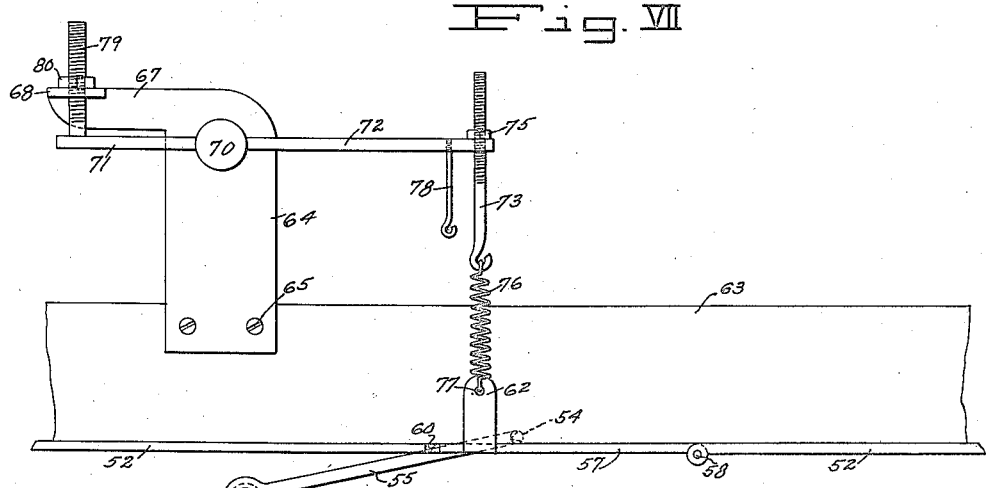
Fig. V
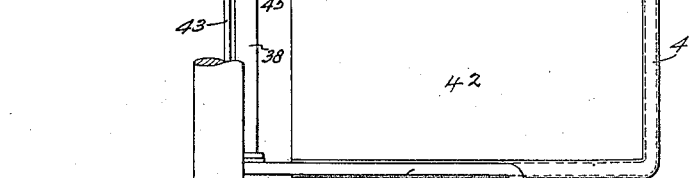
Fig. VI
Inventor:
Ben Perley Poore,
By
Atkins & Atkins,
Attorneys.

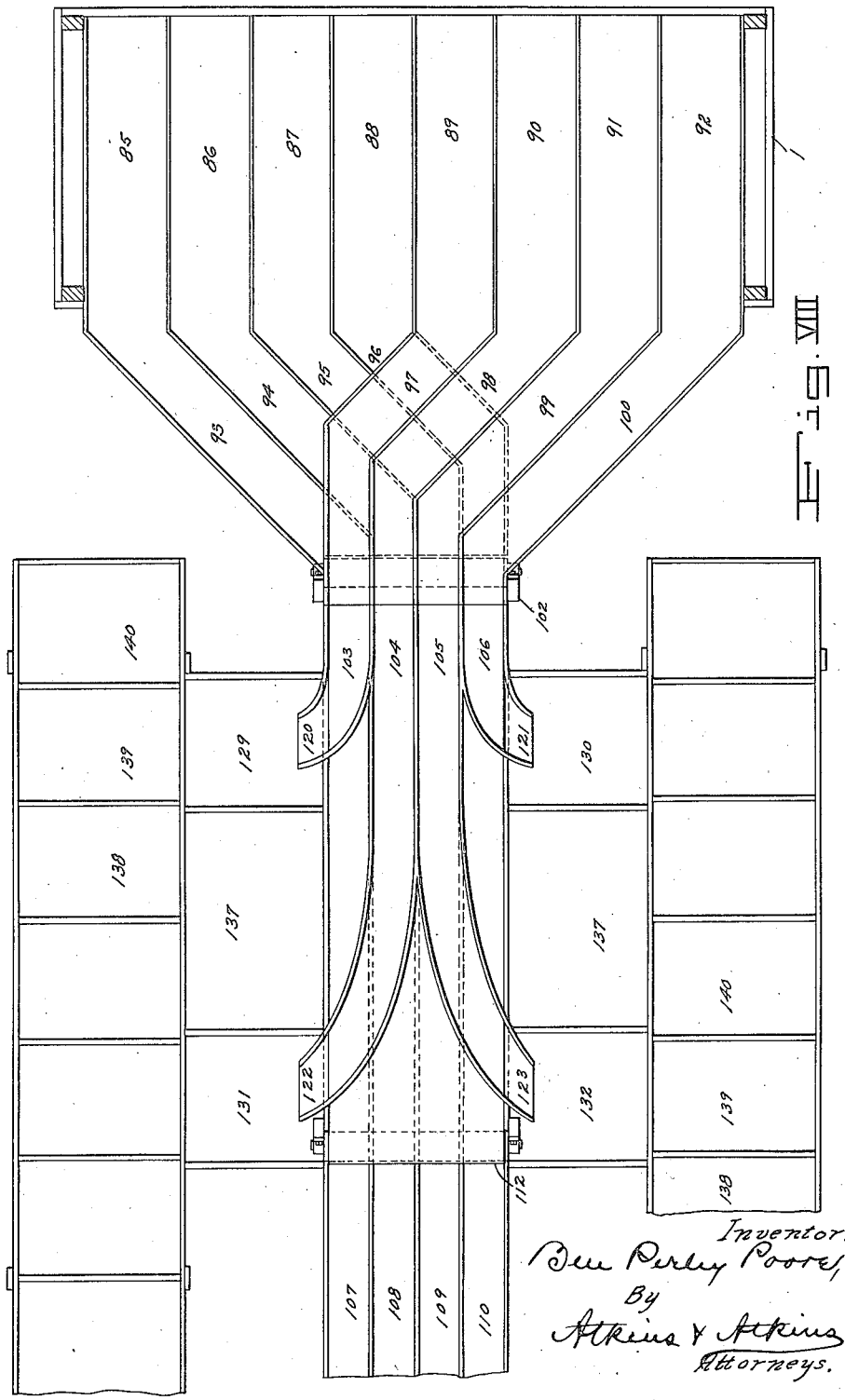

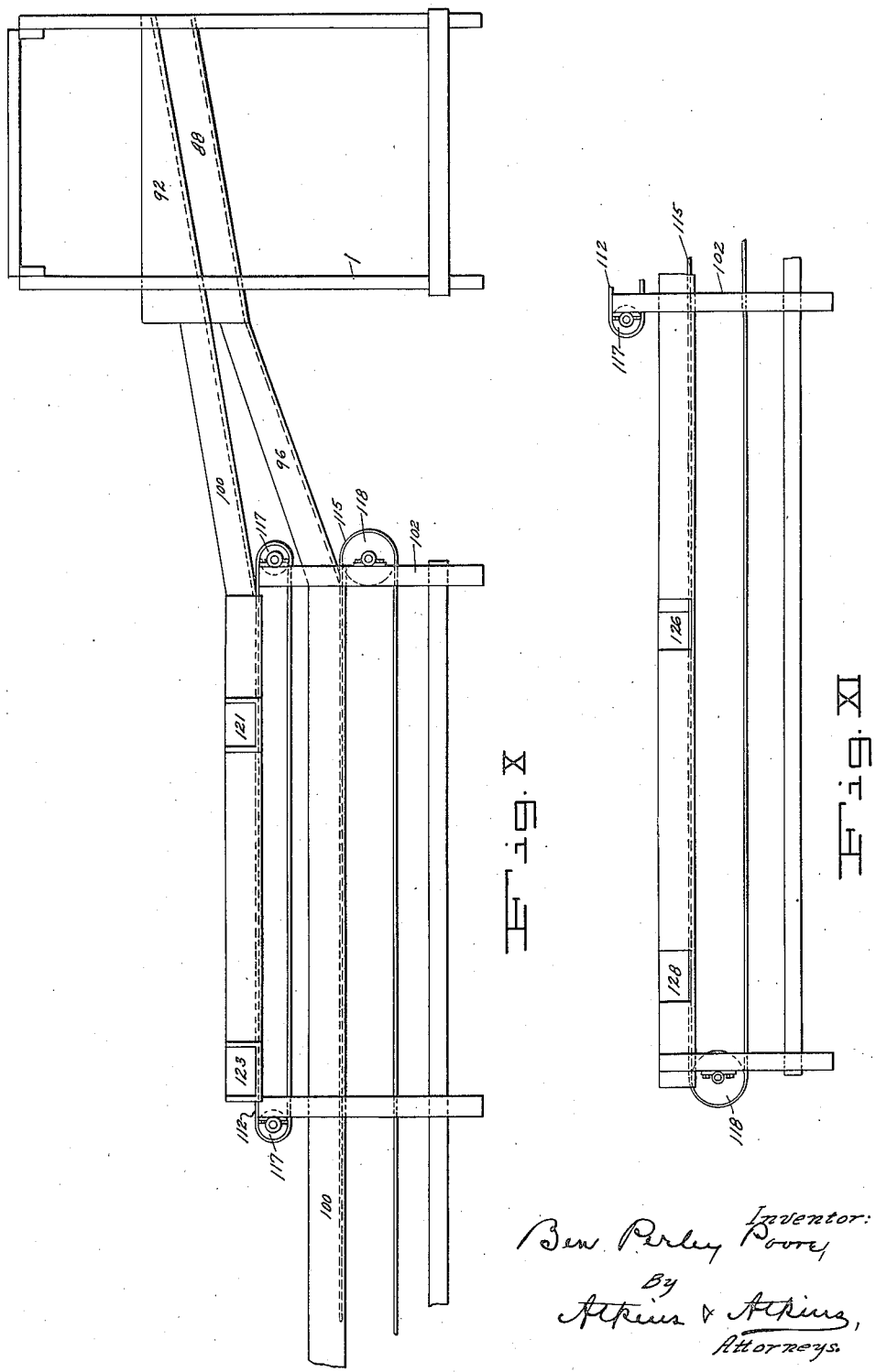

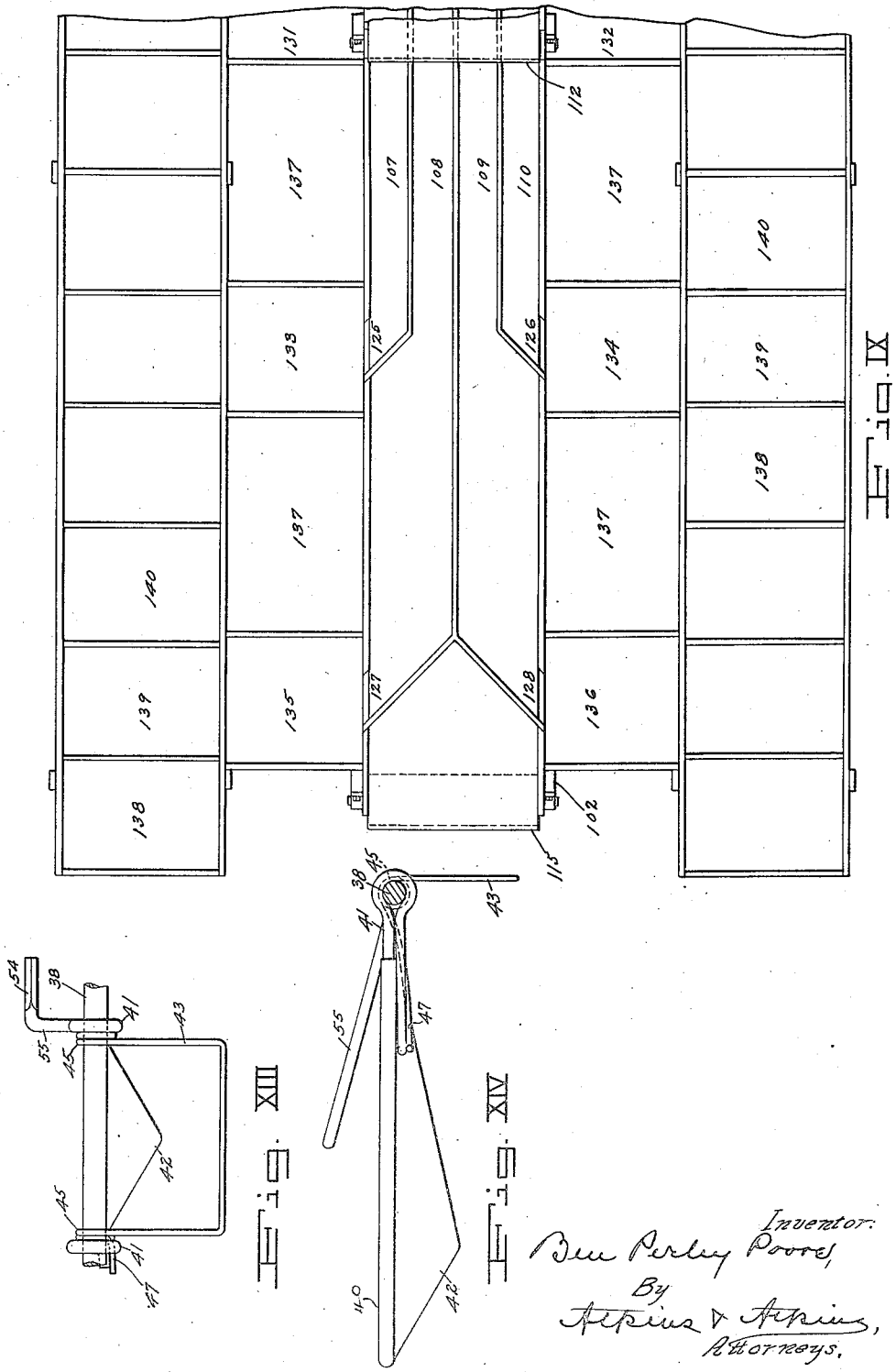

Patented June 3, 1924.

1,496,376

UNITED STATES PATENT OFFICE.

BEN PERLEY POORE, OF SELAH, WASHINGTON, ASSIGNOR, BY MESNE ASSIGNMENTS, OF ONE-HALF TO FRANK W. CUTLER AND ONE-HALF TO ASA B. CUTLER, BOTH OF PORTLAND, OREGON, COPARTNERS, DOING BUSINESS AS THE CUTLER MANUFACTURING COMPANY.

MACHINE FOR SIZING AND DISTRIBUTING FRUIT AND OTHER ARTICLES.

Application filed October 13, 1921. Serial No. 507,452.

*To all whom it may concern:*

Be it known that I, BEN PERLEY POORE, a citizen of the United States of America, and resident of Selah, in the county of Yakima, in the State of Washington, have invented certain new and useful Improvements in Machines for Sizing and Distributing Fruit and Other Articles, of which the following is a specification, reference being had to the accompanying drawings.

My invention relates to machines for sizing by weight ponderable articles as, for example, vegetables, fruit, or apples, and to apparatus for distributing, according to size, articles sorted by any suitable means into appropriate receptacles out of which they may be taken for filling portable containers for shipment.

The necessity for sorting such articles as apples, for instance, is well recognized in the fruit industry, and various machines for accomplishing that purpose in one way and another are well known in the art.

The general object of my invention may, therefore, be stated to be the improvement of apparatus for effecting the sorting of articles, whereby greater economy of sizing of articles may be accomplished.

The economy referred to may be promoted by a variety of contributing factors, such, for example, as cheapness, and simplicity, of the machine, dependableness and effective speed of operation, and diminution of the cost of operating the machine. To all of those factors and to other novel and useful results my invention contributes, as will be apparent, to one skilled in the art to which it relates, from the specification.

It should be observed, in a general view of my invention, that while the form of embodiment of it herein shown and described is that of a machine for sizing articles by weight, my invention comprehends other forms in respect to its feeding mechanism by which the articles are delivered to the sizing mechanism, and in respect to the mechanism for distributing the articles after they are selected according to size. Although particularly well adapted to be used in connection with the preferred form of sizing mechanism I show, said feeding and distributing mechanisms, respectively, may also be used to operative advantage in combination with other types and forms of sizing machines as well as other methods of sizing.

Various objects and advantages of my apparatus besides those above enumerated, will be apparent from the following specification.

What constitutes my invention will be hereinafter specified in detail and succinctly set forth in the appended claims.

In the accompanying drawings, wherein is illustrated my invention in form of embodiment at present preferred.

Figure I is a side elevation, partly in vertical longitudinal section, of my machine.

Figure II is a vertical transverse section taken on the line II—II of Figure I.

Figure III is a vertical transverse section taken on the line III—III of Figure I.

Figure IV is a top plan view of so much of my machine as is shown in Figure I.

Figure V is a side elevation on an enlarged scale of a detached portion of the article-weighing portion of my invention in present preferred form of embodiment.

Figure VI is a top plan view of the subject-matter of Figure V.

Figure VII is a partially diagrammatic elevation of one side of my complete machine in preferred form, looking towards the side upon which the laterally disposed article-distributing mechanism is located.

Figure VIII is a top plan view of part of the article-distributing mechanism of my machine, detached.

Figure IX is a top plan view of the remaining portion of my article-distributing mechanism, complementary to that illustrated in Figure VIII.

Figure X is a partially diagrammatic side elevation of the subject-matter of Figure VIII.

Figure XI is a side elevation of the subject-matter of Figure IX.

Figure XII is a reversed side elevation, detached and on enlarged scale, of the driving shaft of the feed mechanism shown in Figure I.

Figure XIII is a rear elevation, on an enlarged scale, of an article-carrier frame and lifter detached.

Figure XIV is a side elevation of the subject matter of Figure XIII.

Figure XV is a top plan view of the subject matter of Figure XII, with parts in different position.

Before proceeding to a specification of details, it may be well to state in a preliminary way, that the feed mechanism of my apparatus is found mainly in Figure I, and partly in Figures II, III, and IV.

The elevating mechanism, which is of an intermediate nature, is closely related to said feed mechanism, and is displayed in front elevation in Figure III, reference being also had to Figures I and IV.

Details of the article-weighing mechanism are shown in Figures V, and VI, with particular reference to Figure I for explanation of the relationship of said details to the whole machine.

Figures VII to XI, inclusive, illustrate the article-distributing mechanism of my machine.

Adverting now to the reference numerals on the drawings, 1 indicates the main frame of my machine which may be of any kind of oblong structure, of any suitable dimensions preferred, and which may be made of wood, constructed in any suitable manner according to preference. Besides the main frame, there are provided, as occasion demands, similarly constructed supporting frames, such, for example, as those shown in Figures X and XI.

Also a feed-mechanism frame, indicated by 5, is shown in side elevation and cross-section, respectively, in Figures I and II, respectively, and in top plan in Figure IV.

Referring now, particularly to Figures I and IV, 7 and 8, respectively, indicate two rotative shafts, whose respective opposite ends are suitably journalled in the frame 5. Each of the shafts 7 and 8 is provided with and secured coaxially to a cylindrical roller 9. The pair of rollers 9, both rollers being counterparts one of the other, carries a plurality of endless conveyor belts 10 that are drawn, respectively, taut about said rollers. Said belts 10, illustrated, for example, as three in number, travel over the upper surface of a horizontal table 11 which supports them, and are spaced one from another and from sides of the frame 5, respectively, as by spacing strips 12 whose faces, where they oppose one another, are preferably bevelled as indicated at 13, so that each pair of opposing strips 12 with its intermediate belt 10 constitutes, in effect, an open-ended trough.

A hopper 15, disposed above and at an incline towards the troughs last indicated, is provided on the frame 5 for the reception in mass of articles as they are supplied to it.

The shaft 7 is disposed near the end of the frame 5 that is opposite the hopper 15, adjacent to the end of the table 11. Beyond the shaft 7 and its belts 10, and approximately at the overhanging extremities of the strips 12 in which it is suitably mounted, is a rock-shaft 16. Said shaft carries, preferably, a plurality of stop-feeds 17, as many in number as there are belts 10, that is to say, one for each belt. Each stop-feed is fixed to the rock-shaft 16 and is carried by it between a pair of strips 12. Each stop-feed is preferably a sector-shaped open metal casting, provided with a preferably segmental wall 18, which co-operates with a radial plane 19 of the stop-feed to form a pocket, whereof the wall 18 constitutes a mechanical cut-off.

The plane 19, otherwise denominated the bottom of said pocket, substantially fills the space between the strips 12 which flank it, and is disposed so that it may lie, in the horizontal position, substantially flush with the top of the upper stretch of its belt 10. The horizontal may be considered its normal position because it is that to which its descent is limited by coacting supporting members on the ends of the respective shafts 7 and 16, where they are extended beyond the frame 5 (best shown in Figures I, II, XII, and XV). Said supporting members may consist simply of a radially disposed ponderable arm 20 fixed to the shaft 16, which is caused to descend by gravity towards the projecting end of the shaft 7 that is interposed to prevent its further drop. The end last named of the shaft 7 carries a wing-plate 21 that is medially fixed to it, so that, twice with each revolution of the shaft 7, the wing-plate 21 functionates to lift the arm 20 and through it to actuate the several stop-feeds 17, substantially to a position corresponding to that in which one is illustrated in Figure I.

A driven sprocket-belt 25 is the preferred means for driving the shaft 7 with its roller 9, whereby it drives the belts 10 upon the paired rollers 9, previously specified.

The frame 1 is disposed in operative proximity and in fixed relationship to the frame 5, and is provided with a plurality, preferably four in number, of pairs of sprocket wheels, 26, 27, 28, and 29, fixed, respectively, to shafts 31, 32, 33, and 34, that are mounted, respectively, in suitable bearings on the frame 1. The two individuals of each pair of said sprocket wheels are mounted upon their shafts, respectively, near their ends, for example, as illustrated. Each set of four of said sprocket wheels on one side of the frame 1 is operatively connected as by a belt, for example a sprocket-belt 35. The shaft 33 is provided with a belt-pulley, fixed to it, and is thereby constituted the driving shaft of all the shafts 31 to 34, inclusive. It also drives the shafts 7 and 8, the former being connected with a sprocket-wheel 37 on the shaft 31, by means of the belt 25 aforesaid.

The two sprocket-belts 35 travel synchronously and carry between them at suitable equal intervals cross-bars 38, whose opposite ends, respectively, are mounted in aligned opposite points in the belts 35, as for example, links of sprocket-belts, if sprockets are used.

The rotation of the shaft 7 is timed to the rate of movement of the belts 35, so that each time the wing-plate 21 functionates to actuate the stop-feeds 17, a cross-bar 38 will be presented substantially in the same horizontal plane with the rock-shaft 16 as shown in Figure I.

Each cross-bar 38 carries a transverse series of article-carriers 40, the number of the series being equal to the number of stop-feeds 17, and each series being in alignment as stated above with one of the stop-feeds. Each carrier 40 is preferably constructed as shown, for instance, in Figures V and VI, being composed of a rectangularly shaped metal frame 41 hinged at one end to the cross-bar 38 that carries it, and of a flexible pocket 42 depending from the frame 41 and preferably made of strong cloth or like fabric. Compare Figures V, VI, XIII, and XIV.

In operation, in passing along the stretch between the pulleys 29 and 26, the article-carriers 40 hang pendulously from their respective cross-bars 38, as shown for example in Figure I; but each is provided with a lifter, consisting preferably of a wire frame provided with a loop 43, and, near its opposite ends, with coils 45 that pivotally encircle a cross-bar 38 and by which the lifter is spaced between the hinge ends of a frame 41 (see Figures III, V, VI, XIII, and XIV). The lifters being hinged to the cross-bars 38 by their coils 45, also hang therefrom pendulously with the carriers 40, so long as they are free to do so. Each loop 43 is operatively connected to a carrier so as to cause rotative movement imparted to the lifter to be communicated to its carrier. Means for communicating such movement are provided, preferably, in a crank-arm 47 on one end of each lifter, formed by an elbow in the end of the wire of which the lifter is, as has been specified, preferably made. Each crank-arm 47 extends so as to come into operative engagement with the frame 41 to which it belongs whenever said frame passes over the sprocket wheel 26, and is disposed substantially at right angles to the loop 43, so that if the loop be caused to assume a definite position, the cross-arm, and with it its frame 41, will thereupon automatically assume a position substantially at right angles thereto.

Wherefore, I provide upon the frame 1, for each of the series of article-carriers a lifter-actuating-strip 50, said strips being all secured to cross-pieces 51 on the frame 1 as shown, for example, in Figure III. The strips 50 being substantially vertical, are disposed respectively, in the path of movement of one of the series of loops 43, so as to engage said loops successively as the carriers 40 assume vertical direction of movement in passing from the sprocket wheel 26 to the sprocket wheel 27, through the driving operation of the belts 35, as shown in Figure I. Upon such engagement, successively, of each of the loops 43 of the lifters with its strip 50, each lifter in turn causes its article-carrier 40 to assume a horizontal position, as shown in Figure I, and to hold that position so long as said engagement continues.

It being necessary, however, to maintain the article-carriers in a substantially horizontal position for a longer period than that during which said engagement continues, I provide for each successive series of article-carriers a carrier supporting track 52, the number of the tracks being three in the machine illustrated.

Each of the tracks 52 is provided with a downwardly curved terminal 53 that is disposed in the path of a crank-arm 54 of a carrier-supporting arm 55, see Figures V, VI, XIII, and XIV for details. The relative disposition of the terminals 53 to the strips 50 is such as to substitute engagement of the crank-arm 54 of each carrier with a track 52, for that of a corresponding loop 43 with a strip 50, substantially at the moment of disengagement of the members 43 and 50, with the effect of maintaining the article-carrier 40 in horizontal position during said substitution.

After engagement of a crank-arm 54 by a terminal 53, as last explained, the article-carrier 40, of which said crank-arm is a part, will travel along the full length of the track 52, of which the said terminal constitutes the forward end, unless it is sooner released from engagement therewith. The means for effecting such release is an important feature of my invention and enters into the article-weighing mechanism thereof, the method of sizing articles by my invention being one in which the individual weight of an article determines its classification as to size. The method of sizing by weight is already known, in a general way, in the art to which my invention belongs, and my invention, albeit of considerable generic scope in itself, constitutes improvement in the art relating thereto.

In respect to those features that are alluded to in the last paragraph, it is now specified that each track 52, although continuous in one aspect, is potentially broken, since it is provided at certain determinate intervals with hinge-sections or droppers 57, of which one is well illustrated in Figures V and VI. Each dropper 57 constitutes, in effect when in alignment therewith, a continuation of the track 52. It is hinged, as indicated at 58, to an immovable portion of the track, which the numeral 52 indicates where distinction between such portions and the droppers 57 requires separate identification in the drawings. The axis of each hinge 58 is horizontally disposed, and each hinge is located at what may be termed the forward end of each dropper, because it is that end which each oncoming article-carrier 40 in the operation of the machine first approaches. The end of each immovable portion of each track 52 is likewise designated its forward end, and is referred to because it is provided, preferably, with an obliquely disposed undercut bevel-edge 60, to which the next adjacent end of its associated dropper 57 is conformable, as is shown, for example in Figures V and VI, and whose purpose and function will presently appear. In relation to the bevel-edge 60, each crank-arm 54 is obtusely knife-edged, on the reverse side, as shown, for example, in Figures V and VI. Said knife-edge shape insures operative engagement of an oncoming crank-arm with an exposed edge 60, and thereby insures substantial exactitude of operation in the sizing function of the machine.

In order to maintain, in effect, the continuity of the tracks 52, despite the presence in them of the droppers 57, it is necessary to provide means for supporting each dropper against gravity. To that end I provide, as best shown in Figures V and VI, near the free end of each of said droppers, a lateral projection 61 that preferably terminates in an upturned lug 62. Over each projection 61, a rail 63, on the frame extends substantially from end to end thereof, so as to constitute a stop-piece to limit the uplift of each dropper in truing the track. Upon the rails 63, I provide, at intervals corresponding to those which separate the droppers 57, for each dropper a fixed supporter 64, that is preferably made in the form of a plate secured, as by screws or bolts 65, to the side of a rail 63, and which preferably terminates in a deflection 67 disposed in a plane parallel to the face of said rail, said deflection 67 terminating in a lug 68, whose flat side is disposed horizontally.

Each set of supporters or plates 64 is ranged in transverse alignment across the frame 1, as are the droppers 57, so that each set may serve to carry, in suitable bearings provided for them in said supporters or plates, a rock-shaft 70, which extends operatively across all of the rails 63, and, at one end, a little beyond the frame 1, as shown, for example, in Figure IV.

Each rock-shaft 70 carries for each track 52 two arms which, extending in opposite directions from it, are fixed to it (see Figures V and VI) and are numbered, respectively 71 and 72. The arm 72 is provided near its free end with an aperture whose vertical axis is in vertical alignment with that of the lug 62 of the dropper 57 directly below it. Within said aperture is loosely accommodated an eye-bolt 73, which is adjustably supported upon the arm 72 as by a nut 75 screwing upon the threaded end of the eye-bolt. A tensile spring 76 constitutes a scale, and connects the eye of the eye-bolt with an aperture 77 provided for it in the lug 62 below it. By the side of each eye-bolt 73, I provide a cut-out hook 78, as shown only in Figure V. Although it is, for a purpose hereinafter specified, a preferred accessory to each eye-bolt, it is, because of the small scale to which the general figures of the drawings are drawn, omitted from all figures except Figure V whose scale admits of good illustration.

The arm 72 is held in substantially horizontal position by aid of the arm 71. To that end the free end of the latter extends underneath the lug 68 that is provided for it, so as to engage by abutment against the end of a set screw 79 that is threaded for adjustment into an aperture provided for its accommodation in the lug 68, and is held to adjustment when fixed, as by a locknut 80 (see Figure V).

In operation, each set screw 79 is nicely adjusted and afterwards fixed in adjustment by its locknut, so as to support the upper face of the dropper 57 to which it belongs, substantially in exact alignment against a rail 63 with the upper face of the track 52. By such adjustment the surface of the track 52 is rendered flush in all its parts from end to end and offers no impediment to the smooth travel over it of the successive crank-ends 54, despite the presence in the track 52 of the droppers 57.

Consequently, each rock-shaft 70, its arms 71 and 72, its set screw 79, and means for connecting the arm 72 with the lug 62 of a dropper 57, constitute a combination that may be appropriately denominated a track aligner, by which general term it is convenient to designate it as occasion may require in the appended claims.

It is here proper to note that the spring 76 serves, in the combination last above described, only as a means of connection, its functional capacity belonging only to the individual article-weighing mechanism of which description next follows.

The function of the spring 76 is as specified, that of a scale to weigh the contents of each loaded article-carrier 40, with the purpose and result that an article-carrier loaded with an article of a certain weight will, by gravity, drop from the horizontal when it reaches a dropper 57 whose critical adjustment, as I term it, obtained by regulation of the tension of its spring 76, corresponds to the load of said carrier, and, turning upon its cross-bar 38, there discharges its load; but which will refuse to drop and discharge its load until, in its travel over the track 52, it finds a dropper 57 whose critical adjustment is for a weight that is preponderated by the weight of the load in said carrier.

To the end described in the last paragraph, each spring 76 of each consecutive dropper 57 of a series is set to different critical adjustments, in graduated ratio. This may be accomplished by separate manipulation of the several nuts 75, to which the disposition of the eye-bolts 73 in the clear, above the machine, lends facility, and which may be effected while the machine is either at rest or while it is in motion. By this means the operation of the machine may be kept constantly under control of the will of the operator, so that the sorting of articles may be varied at discretion even while the machine is in action, and also, if desired, with interruption of some of the droppers without interfering with the operation of others.

To accomplish the end suggested in the last preceding clause, a cut-out hook 78 may be used to engage each spring 76. To illustrate, if a certain run of apples through the machine is being made, wherein the number of apples of one size is disproportionate to the number of apples of other sizes, it might happen that the delivery of apples of the first named size would be congested towards certain receptacles or points of discharge, while other receptacles would remain comparatively empty. The result would be that the crowded receptacles would demand more attention than the attendants could give.

By my invention it is practicable to cut out some of the droppers, even of a transverse series of droppers, so as to render them inoperative by certain weights of apples. In that way distribution of the apples into selected receptacles at pleasure may be effected. Suppose, for example, the transverse series of droppers on any one or more of the cross-bars 38 be set to discharge the same weight of apples, and that the supply of apples at the time is running excessively to that weight. All that is necessary to do in order to relieve the congestion of apples of that size at the point of discharge, is to remove one of the springs 76 of the series from its eye-bolt connection and hang it on its cut-out hook 78, which being shorter than the eye-bolt increases the tension on the spring. This is accomplished without disturbance of the track alignment of the dropper 57 affected or of the critical adjustment of the spring 76. One or more springs may be cut out as desired, and may be afterwards restored to operation at will, without disturbance of their respective critical adjustments. The advantages of providing means for such control, it is believed, will be understood by one skilled in the art without further explanation.

Likewise, the provision of means outside of the machine for adjusting the droppers in sets to true operative positions, and the provision of the tracks 52 above the article-carriers 40, that are underhung with respect thereto, present advantages which will be readily apprehended by those skilled in the art.

It is obvious that as articles are segregated one from another by size, as, for example, by the method hereinbefore described, or otherwise if preferred, they must be deposited into suitable receptacles from which they may be removed and supplied to portable containers for shipment. Now, it is advantageous and makes for economy to restrict the size of the sorting mechanism to a practicable minimum, but without provision of special means for ultimate delivery of the articles to the attendant packers, that minimum to which reduction of the size of said machine may be made practicable must be much larger than what the mere sorting of the articles demands.

The means which I have invented for combining the reduction in size of a sorting machine with adequately spacious distributing mechanism, contemplates the employment, in connection with the sorting machine, of initial receptacles of smallest practicable capacity, but which are contrived to make discharge into ultimate receptacles of any capacity and relative disposition that may be preferred.

In the present preferred form of my invention, so far as it relates to article-distributing mechanism, I provide as many initial receptacles of restricted capacity as may be necessary. In the drawings, which show the distributing mechanism adapted to the sizing machine above specified, I illustrate in Figure VII eight initial receptacles by way of example, it being understood that the number thereof may be increased or diminished at discretion. Said initial receptacles are indicated, respectively, by numerals 85 to 92 inclusive. Each initial receptacle is preferably removable from the frame, and preferably accommodates, as shown in Figure X, as many droppers 57 as are employed in transverse series, the number being three in the machine illustrated.

With each initial receptacle communicates one chute, the eight chutes illustrated being indicated respectively, by numerals 93 to 100, inclusive.

The initial receptacles and one end of the several chutes are supported preferably by the frame 1, aforesaid, the Figures VII to X, inclusive, of the drawings being diagrammatical only, so far as the article-weighing mechanism is concerned, as will appear particularly in Figure X.

The several chutes have a downward inclination from their respective initial receptacles, so as to effect discharge of their contents by gravity, and have their lower convergent ends supported by a frame 102 in two or more series disposed, respectively, on different levels. In the drawings (Figure VII) I show two of such series, with the discharge ends of four of the chutes disposed in one series and those of the remaining four in the other series.

For each of said series, four chute-extensions in relative parallel disposition are provided, one chute-extension to a chute. The chute-extensions are indicated by numerals 103 to 110, inclusive.

The bottom of each chute-extension consists of an endless conveyor belt, of which two, one of the four for each of the series aforesaid, are illustrated in Figures X and XI, that of the upper series being indicated by the numeral 112, and that of the lower, by the numeral 115. Each endless belt is carried by a pair of rollers mounted in suitable respective bearings in a supporting frame 102. The two rollers for the belt 112 are indicated by the numeral 117, and those for the belt 115, by the numeral 118. Of each pair of rollers, one should be understood to be a driving roller, and the other a driven roller. Either roller of each pair may functionate as the driving roller and be actuated by power applied in any usual or preferred manner not necessary to illustrate.

Each chute-extension has its individual lateral discharge chute, four being shown in Figure VIII, and indicated, respectively, by numerals 120, 121, 122, and 123. The lateral discharge chutes for the remaining four chute-extensions are shown in Figure IX, and are indicated, respectively, by numerals 125, 126, 127, and 128. The preferred alternate arrangement of the discharge end of each of the chutes 120 to 123, and 125 to 128, is clearly shown in Figures VIII and IX.

Each lateral discharge chute has its individual bin into which it makes discharge, the eight bins required in the machine under consideration being indicated by numerals 129 to 136, inclusive. Each bin is preferably hinged or otherwise movably secured to the frame 102, see Figure VII.

The said bins are preferably disposed in pairs upon opposite sides of the assemblage of chute-extensions, and are preferably separated by one of six open spaces, and indicated in Figures VIII and IX by 137, within which an attendant may work, and to or from which he may pass by moving a bin out of the way, and afterwards restoring it to place.

I prefer to provide in convenient juxtaposition to each bin three boxes, 138, 139, and 140, into which articles, for example apples, may be by an attendant selected and sorted from the bins, according to color, for instance.

The following is a brief description of the operation of my machine.

Power being applied to the driving pulleys to set the machine in motion, articles of all sorts to be sized are supplied to the hopper 15, whence they descend into the troughs defined above the respective conveyor belts 10, in which they are aligned by the travel of the belts. The end of each line of articles abuts against the segmental cut-off 18 which, by the intermittent rising and falling of the stop-feeds 17, segregates from the line one article at a time.

With each uplift of a stop-feed, an article-carrier 40 is, by the timing of the operation of the machine, presented to it substantially in the position shown in dotted lines in Figure I, so that the downward inclination of the bottom 19 of the pocket of the stop-feed effects deposit by gravity of the article from the pocket into the article-carrier.

The loaded article-carrier ascends toward the track terminal 53 provided for it, and after its crank-arm 54 has been engaged thereby, it is carried in horizontal disposition, so as to hold its load, along its track 52.

It travels along the track until it finds a dropper 57 whose critical adjustment permits it to fall upon its hinge 58 sufficiently to expose its next adjacent bevel-edge 60 to engagement by the edge of its crank-arm 54. Thereupon continued advance of the article-carrier releases it from support by its dropper 57 so as to cause it to turn upon its supporting cross-bar 38 and to discharge its contents into the initial receptacle provided below it for its reception. Thence the article so discharged follows the course determined for it by the initial receptacle into which it drops, until it reaches its proper bin 129—136 of the article-distributing mechanism.

From the bin an attendant grades and selects each article and deposits it into the proper box 138—140, or culls it and disposes of it according to any ordinary or convenient means provided for disposition of culls.

Each dropper 57, after release of a loaded carrier, immediately resumes, under tension of its spring 76, its alignment in the track 52, ready for the reception of the crank-arm 54 of the next oncoming carrier.

What I claim is:

1. In a machine for sizing articles by weight, the combination with a series of pivotally supported article-carriers, and means for driving them horizontally in continuous succession, of a continuously horizontal track disposed above said article-carriers in operative relationship to them, supporting means operatively connecting each article-carrier with the track for holding it in horizontal position, and scale-controlled droppers operatively disposed at intervals in said track in the path of movement of said supporting means.

2. In a machine for sizing articles by weight, the combination with a series of pivotally supported article-carriers, and means for driving them horizontally in continuous succession, of a horizontal track disposed above said article-carriers in operative relationship to them, supporting means operatively connecting each article-carrier with the track for holding it in horizontal position, scale-controlled droppers operatively disposed at intervals in said track in the path of movement of said supporting means, and means for adjusting the several droppers in true alignment to the track.

3. In a machine for sizing articles by weight, the combination with a series of pivotally supported article-carriers, and means for driving them horizontally in continuous succession, of a horizontal track disposed above said article-carriers in operative relationship to them, supporting means operatively connecting each article-carrier with the track for holding it in horizontal position, scale-controlled droppers operatively disposed at intervals in said track in the path of movement of said supporting means, and means for adjusting the several droppers in true alignment to the track, said means of adjustment being disposed at a distance from the track convenient for manipulation.

4. In a machine for sizing articles by weight, the combination with a plurality of series of pivotally supported article-carriers, and means for driving said several series in continuous succession, respectively, of a corresponding plurality of horizontal tracks each in operative relationship to one of said series, supporting means operatively connecting each article-carrier with its track for holding it in horizontal position, scale-controlled droppers operatively disposed at intervals in said several tracks in the path of movement of their respective carrier supporting means, and means common to all the tracks for adjusting the several droppers of each track in true alignment to its track.

5. In a machine for sizing articles by weight, the combination with a plurality of series of pivotally supported article-carriers, and means for driving said several series in continuous succession, repectively, of a corresponding plurality of horizontal tracks each in operative relationship to one of said series, supporting means operatively connecting each article-carrier with its track for holding it in horizontal position, scale-controlled droppers operatively disposed at intervals in said several tracks in the path of movement of their respective supporting means, means common to all the tracks for adjusting the several droppers of each track in true alignment to its track, said means comprising for each dropper a rock-shaft common to the several tracks, and means for adjusting its position in reference to the droppers connected to it.

6. In a machine for sizing articles by weight, the combination with a plurality of series of pivotally supported article-carriers, and means for driving said several series in continuous succession, respectively, of a corresponding plurality of horizontal tracks each in operative relationship to one of said series, supporting means operatively connecting each article-carrier with its track for holding it in horizontal position, scale-controlled droppers operatively disposed at intervals in said several tracks in the path of movement of their respective supporting means, means common to all the tracks for adjusting the several droppers of each track in true alignment to its track, said means comprising for each dropper a rock-shaft common to the several tracks, and means for adjusting its position in reference to the droppers connected to it, said means of adjustment consisting of an arm projecting from one side of the rock-shaft into engagement with a set screw provided in adjustably fixed relationship to its free end.

7. In a machine for sizing articles by weight, the combination with a plurality of series of pivotally supported article-carriers, and means for driving said several series in continuous succession, respectively, of a corresponding plurality of horizontal tracks, each in operative relationship to one of said series, supporting means operatively connecting each article-carrier with its track for holding it in horizontal position, scale-controlled droppers operatively disposed at intervals in said several tracks in the path of movement of their respective supporting means, means common to all the tracks for adjusting the several droppers of each track in true alignment to its track, said means comprising for each dropper a rock-shaft common to the several tracks, means for adjusting its position in reference to the droppers connected to it, and a weighing device on each rock-shaft for regulating the critical adjustment of each individual dropper.

8. In a machine for sizing articles by weight, the combination with a plurality of series of pivotally supported article-carriers, and means for driving said several series in continuous succession, respectively, of a corresponding plurality of horizontal tracks, each in operative relationship to one of said series, supporting means operatively connecting each article-carrier with its track for holding it in horizontal position, scale-controlled droppers operatively disposed at intervals in said several tracks in the path of movement of their respective supporting means, means common to all the tracks for adjusting the several droppers of each track in true alignment to its track, said means comprising for each dropper a rock-shaft common to the several tracks, means for adjusting its position in reference to the droppers connected to it, a weighing device on each rock-shaft for regulating the critical adjustment of each individual dropper, said weighing device consisting of a tensile spring and a supporting arm projecting from one side of the rock-shaft, and individual means for regulating the tension of each spring.

9. In a machine for sizing articles by weight, the combination with a plurality of series of pivotally supported article-carriers, and means for driving said several series in continuous succession, respectively, of a corresponding plurality of horizontal tracks each in operative relationship to one of said series, supporting means operatively connecting each article-carrier with its track for holding it in horizontal position, scale-controlled droppers operatively disposed at intervals in said several tracks in the path of movement of their respective supporting means, means common to all the tracks for adjusting the several droppers of each track in true alignment to its track, said means comprising for each dropper a rock-shaft common to the several tracks, means for adjusting its position in reference to the droppers connected to it, a weighing device on each rock-shaft for regulating the critical adjustment of each individual dropper, said weighing device consisting of a tensile spring and a supporting arm projecting from one side of the rock-shaft, and individual means for regulating the tension of each spring, the said means consisting of an eye-bolt loosely supported in said arm, and an adjustment nut threaded to the eye-bolt above said arm.

10. In a machine for sizing articles by weight, the combination with a plurality of series of pivotally supported article-carriers, and means for driving said several series in continuous succession, respectively, of a corresponding plurality of horizontal tracks in operative relationship to one of said series, supporting means operatively connecting each article-carrier with its track for holding it in horizontal position, scale-controlled droppers operatively disposed at intervals in said several tracks in the path of movement of said supporting means, respectively, means common to all the tracks for adjusting the several droppers of each track in true alignment to its track, said means comprising for each dropper a rock-shaft common to the several tracks, means for adjusting its position in reference to the droppers connected to it, a weighing device on each rock-shaft for regulating the critical adjustment of each individual dropper, said weighing device consisting of a tensile spring and a supporting arm projecting from one side of the rock-shaft, and individual means for regulating the tension of each spring, said means of adjustment being disposed within easy access for manipulation above the entire machine.

11. In a machine for sizing articles by weight, the combination with a plurality of series of pivotally supported article-carriers, and means for driving said several series in continuous succession, respectively, of a corresponding plurality of horizontal tracks in operative propinquity to a horizontal succession of said carriers in their respective series, supporting means operatively connecting each article-carrier with its track for holding it in horizontal position, scale-controlled droppers operatively disposed at intervals in said several tracks in the path of movement of said supporting means, respectively, means common to all the tracks for adjusting the several droppers of each track in true alignment to its track, said means comprising for each dropper a rock-shaft common to the several tracks, means for adjusting its position in reference to the droppers connected to it, a weighing device on each rock-shaft for regulating the critical adjustment of each individual dropper, said weighing device consisting of a tensile spring and a supporting arm projecting from one side of the rock-shaft, individual means for regulating the tension of each spring, and a cut-off for supporting the spring and its dropper independently of the means last named.

12. In a machine of the kind described, the combination with a succession of pivotally supported article-carriers, and means for driving them along a portion of their line of travel in a substantially vertical direction, of automatic means for maintaining said carriers, each in a horizontal position, during their vertical ascent, said means consisting of a pivotally supported lifter in operative proximity to each carrier, and means upon the frame of the machine for actuating each lifter to lift its carrier to horizontal position.

13. In a machine of the kind described, the combination with a succession of pivotally supported article-carriers, and means for driving them along a portion of their line of travel in a substantially vertical direction, of automatic means for maintaining said carriers, each in substantially a horizontal position, during their vertical ascent, said means consisting of a pivotally supported lifter in operative proximity to each carrier, and means upon the frame of the machine for actuating each lifter to lift its carrier to a horizontal position, said means comprising a carrier-engaging member, having a loop substantially at right angles thereto carried with the carrier, and a loop-engaging strip upon the frame of the machine.

14. In a machine of the kind described, the combination with a succession of pivotally supported article-carriers, and means for driving them along a portion of their line of travel in a substantially vertical direction, of automatic means for maintaining said carriers, each in substantially a horizontal position, during their vertical ascent, means, also, for driving the article-carriers, successively, in a substantially horizontal line of travel, and automatic means for shifting the support of the individual article-carriers in substantially horizontal position, in passing from their vertical line of travel to their horizontal line of travel.

15. In a machine of the kind described, the combination with a succession of pivotally supported article-carriers, and means for driving them along a portion of their line of travel in a substantially vertical direction, of automatic means for maintaining said carriers, each in substantially a horizontal position during their vertical ascent, means, also for driving the article-carriers successively in a substantially horizontal line of travel, and automatic means for shifting the support of the individual article-carriers in substantially horizontal position in passing from their vertical line of travel to their horizontal line of travel, said means consisting of carrier supporting horizontal tracks, a supporting arm that operatively supports each carrier upon the track in its horizontal line of travel, and a downwardly curved track-terminal adapted to engage each of said supporting arms as its carrier passes from the vertical to the horizontal line of travel.

16. In a machine of the kind described, the combination with a driven series of pendulous article-carriers, and means for driving them along a portion of their line of travel in a substantially vertical direction, of means for holding each article-carrier in horizontal position in its vertical movement, and feeding mechanism adapted to feed articles one by one to an article-carrier at a point in its vertical travel.

17. In a machine of the kind described, the combination with a driven series of article-carriers, means for driving them along a portion of their line of travel in a substantially vertical direction and means for holding each article-carrier in horizontal position in its vertical movement, of feeding mechanism adapted to feed articles one by one to an article-carrier at a point in its vertical travel, said means consisting of a frame, a driven conveyor-belt thereon feeding towards the article-carriers, and means for supplying an individual article from said belt to each of the carriers, in succession.

18. In a machine of the kind described, the combination with a driven series of article-carriers, means for driving them along a portion of their line of travel in a substantially vertical direction, and means for holding each article-carrier in horizontal position in its vertical movement, of feeding mechanism adapted to feed articles one by one to an article carrier at a point in its vertical travel, said means consisting of a frame, a driven conveyor-belt thereon feeding towards the article-carriers, and means for supplying an individual article from said belt to each of the carriers, in succession, said means consisting of a stop-feed, and operatively timed mechanism for causing it to supply an article to each article-carrier.

19. In a machine of the kind described, the combination with a driven series of article-carriers, means for driving them along a portion of their line of travel in a substantially vertical direction, and means for holding each article-carrier in horizontal position in its vertical movement, of feeding mechanism adapted to feed articles one by one to an article-carrier at a point in its vertical travel, said means consisting of a frame, a driven conveyor-belt thereon feeding towards the article-carriers, and means for supplying an individual article from said belt to each of the carriers, in succession, said means consisting of a stop-feed, and operatively timed mechanism for causing it to supply an article to each article-carrier, said stop-feed being sector-shaped and mounted at its axial end on a rock-shaft actuated by said timed mechanism and having a bottom plate which inclines toward said rock-shaft upon operative movement of the rock-shaft.

20. In the machine described in claim 19, the combination with the rock-shaft therein described and a driven shaft parallel thereto, of a ponderable arm projecting from one side of the former in operative relationship to an actuating member on the latter, adapted to lift said arm through rotative movement of its shaft.

21. In a machine for sizing articles by weight comprising a plurality of series of article-carriers and means for driving said several series in continuous horizontal succession, the combination of a series of horizontal tracks one for each of said series, means connected with a track for operatively supporting each article-carrier, individually scale-controlled droppers disposed at intervals in the several tracks, respectively, and means for cutting out of operation the scale control of any dropper at will.

22. The combination with a sizing apparatus, including means for conveying articles and for discharging them at different points according to their respective sizes, of supplementary distributing mechanism comprising a conveying member travelling laterally with respect to said apparatus and adapted to receive the articles therefrom, and means for automatically delivering articles from said member to either side thereof and laterally with respect to its line of travel.

23. The combination with sizing apparatus, including means for conveying articles and for discharging them at different points according to their respective sizes, of supplementary distributing mechanism comprising a plurality of parallel conveying members positioned in distinct horizontal planes and travelling laterally with respect to said apparatus and adapted to receive the articles therefrom, and means for automatically delivering articles from each of said members to either side thereof and laterally with respect to their lines of travel.

24. The combination with a sizing machine, of article-distributing mechanism comprising a laterally directing travelling member laterally disposed to said machine and in operative communication therewith, said mechanism comprehending initial receptacles and chutes communicating with said receptacles, respectively, and having their discharge ends relatively convergent for operative delivery to said travelling member.

25. The combination with a sizing machine, of article-distributing mechanism laterally disposed to said machine in operative communication therewith, said mechanism consisting of initial receptacles, chutes connected therewith having their discharge ends relatively convergent, and divided into series relatively disposed on different levels.

26. The combination with a sizing machine, of article-distributing mechanism laterally disposed to said machine in operative communication therewith, said mechanism consisting of initial receptacles, chutes connected therewith having their discharge ends relatively convergent, and parallel chute-extension operatively provided with driven conveyor-belts.

27. The combination with a sizing machine, of article-distributing mechanism laterally disposed to said machine in operative communication therewith, said mechanism consisting of initial receptacles, chutes connected therewith having their discharge ends relatively convergent, parallel chute-extension operatively provided with driven conveyor-belts, and lateral discharge chutes for the respective chute-extensions.

28. The combination with a sizing machine, of article-distributing mechanism in operative communication therewith, and means for controlling from the intake end of said mechanism the output of articles from the discharge end thereof.

29. In a machine of the kind described, the combination with a horizontal track provided at intervals with droppers, a series of article-carriers, means for supporting them in horizontal disposition upon said track, and means for driving said carriers along said track, of an individual dropper-supporting scale mechanism provided for each dropper and having means of adjustment of its weighing capacity carried above the machine so as to be accessible from above for manipulative control.

In testimony whereof, I have hereunto set my hand in the presence of two subscribing witnesses.

BEN PERLEY POORE.

Witnesses:
G. L. PANKEY,
JENNIE PANKEY.